United States Patent [19]

McCormick

[11] 3,787,059

[45] Jan. 22, 1974

[54] PISTON RING END GUIDE

[75] Inventor: Harold E. McCormick, Ballwin, Mo.

[73] Assignee: Ramsey Corporation, St. Louis, Mo.

[22] Filed: Aug. 14, 1972

[21] Appl. No.: 280,657

[52] U.S. Cl.................... 277/1, 277/9, 277/155, 277/192, 277/219
[51] Int. Cl............................................ F16j 9/18
[58] Field of Search...... 277/1, 9, 9.5, 11, 155, 192, 277/195, 199, 218, 219, 220, 221, 140, 139

[56] References Cited
UNITED STATES PATENTS

| | | | |
|---|---|---|---|
| 1,556,104 | 10/1925 | Gregg | 277/193 |
| 2,768,036 | 10/1956 | Greenough | 277/199 |
| 2,826,468 | 3/1958 | Cowhig | 277/9 |
| 3,261,612 | 7/1966 | Games | 277/154 |
| 3,601,415 | 8/1971 | Bond | 277/9.5 |
| 3,472,521 | 10/1969 | Nisper et al. | 277/140 |
| 3,598,419 | 8/1971 | Nisper | 277/219 |

Primary Examiner—William T. Dixson, Jr.
Assistant Examiner—Robert I. Smith
Attorney, Agent, or Firm—Benjamin H. Sherman et al.

[57] ABSTRACT

An end guide for piston rings and particularly circumferential expansion rings of substantially U-shaped cross section. The rings are split and the end guide functions to align the split ends. The end guide consists of a first member having a head thereon and a projecting lance member. The head is dimensioned to be snugly received between opposed radially extending legs of the ring in a press-fit relation on one side of the gap with the lance crossing the gap and extending between the legs of the ring on the other side of the gap. A second member is press-fit between the legs on the opposite side of the gap from the head and prevents exit of the end of the lance from that side of the gap. The first and second members are attached together at the time of installation of the end guide into the ring.

11 Claims, 10 Drawing Figures

PATENTED JAN 22 1974 3,787,059

PISTON RING END GUIDE

BACKGROUND OF THE INVENTION

1. Field of the Invention

This invention relates to piston rings, more particularly to a piston ring end guide or latch.

2. Prior Art

Piston rings are normally split rings which are split along a gap, leaving circumferential ends.

A common type of split piston ring is an expander or spacer-expander ring, normally used as a part of an oil control ring assembly. When used as such, the oil control ring assembly includes two flat rail rings which are maintained in axially separate position and which are expanded radially outwardly by a circumferential spacer-expander ring. Such spacer-expander rings must have their circumferential end faces at the split gap abutted with one another in operation for the ring to exert the desired degree of expansive force.

During the installation of these rings into a piston groove and the piston into the cylinder, it has been known for such rings to overlap their circumferential end portions. Thus, the circumferential end faces do not abut one another in the correct fashion.

It has been known to provide end guides or latches which aid in assuring that the circumferential end faces of the split ring will properly abut. Such end guides have normally been multi-piece structures which require individual installation of the pieces or have required rings other than the normal U-shaped cross section rings to maintain the latch in the ring, or have had telescoping pieces where a single latch piece was received through a retaining piece. In those cases where multi-piece embodiments have been used or where telescoping members have been used, the expense of construction and installation can be excessive for a member whose only function is during installation of the ring in the piston groove and the piston in the cylinder. Since the end guide serves no operative function after installation, it is extremely desirable to minimize the cost of both the manufacture and the installation of the end guide.

It would therefore be an advance in the art to provide an end guide or latch which is inexpensive to manufacture and to install.

SUMMARY OF THE INVENTION

Our invention provides for an end guide which is both uncomplicated and economical to manufacture and which can be installed in position in the ring in a simple manner.

The end guide of our invention is manufactured as a single piece, preferably by a molding operation. In the preferred embodiment illustrated, a plurality of such end guides are molded as a single piece. The end guide contains a first portion with a head on one end and an elongated lance member projecting from the head, terminating in a barb-like end remote from the head. Projecting from the lance at a point spaced from the head is a latch head portion. The two head portions have projecting nibs thereon for press-fitting into the ring. The latch head portion is adapted to be broken from the first head and lance during installation into the ring. The end guide is installed into a substantially U-shaped cross section ring with the two head portions and the lance in the ring channel in press-fit relation with the legs of the U-shaped cross-section ring. The end guide is inserted with the first head portion on one side of the gap and the latch head portion on the other side of the gap. During insertion, the latch head portion is bent from its original position along a fracture line and breaks off from the lance with the lance entrapped behind the latch head portion and the back wall or bight of the U-shaped cross-section ring. The latch head portion is abutted by the barb-like end of the lance due to the position and curvature of the lance. In this manner, the lance is prevented from projecting out of the channel of the ring by the latch head member and functions as an end guide to assure proper abutment of the circumferential ends of the ring at the gap or split.

By constructing the end guide of this invention as a single piece and installing it as a single piece while breaking it into two pieces during installation, the necessity of handling a number of very small-sized pieces is eliminated. This reduces the cost of installation. Further, the forming of the end guide of this invention as a single molded piece reduces the expense of construction over prior art devices. In addition, the end guide is adaptable to construction in a plurality of attached-together guides, further reducing manufacturing expense.

The end guide is press-fitted into the channel of a U-shaped cross section expander-spacer ring and the head portions have projecting nibs thereon which engage the opposed legs of the spacer-expander. The nibs are of smaller area than the heads themselves and are deformable to provide a press-fit anchoring of the end guide in the ring channel while at the same time deforming to prevent expansion of the ring in an axial direction at that point.

It is therefore an object of this invention to provide an end guide for piston rings.

It is a further object of this invention to provide an end guide for channel-type expander-spacer rings.

It is a more specific object of this invention to provide an end guide for channel-type spacer-expander rings having an elongated member anchored in the channel of the ring on one side of the split gap and projecting into the channel of the ring on the other side of the split gap and retained therein.

It is another and more specific object of this invention to provide an end guide for expander-spacer rings having an elongated member with a head thereon, the head entrapped in the channel of the ring on one side of the split, the member projecting into the channel of the ring on the other side of the split, and a latch head member entrapped in the channel of the ring on the other side of the split retaining the elongated member in the channel.

It is a specific object of this invention to provide an end guide for piston rings wherein the guide is manufactured as a single piece and is split into two pieces during installation into the ring.

It is another and more specific object of this invention to provide an end guide for channel-type split spacer-expander rings with the end guide comprising a first member having a head portion at one end and a lance projecting therefrom, the head portion being insertable into the ring on one side of a split gap and the lance projecting across the gap into the channel on the other side of the gap with a latch head member inserted into the channel on the other side of the gap to maintain the lance in position, the end guide being manufactured with the latch head portion integral with the lance, the latch head portion being separated from the lance during installation and the lance being telescopically received between the back wall of the channel of the ring and the second head.

It is a further and more specific object of this invention to provide an end guide for piston rings which is inserted into a channel in the ring in a press-fit relationship, the end guide having a head portion with nibs projecting therefrom, the nibs being deformable under the pressure of the press-fit relationship to serve as anchors anchoring the head in the ring while deforming to prevent spreading portions of the ring.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
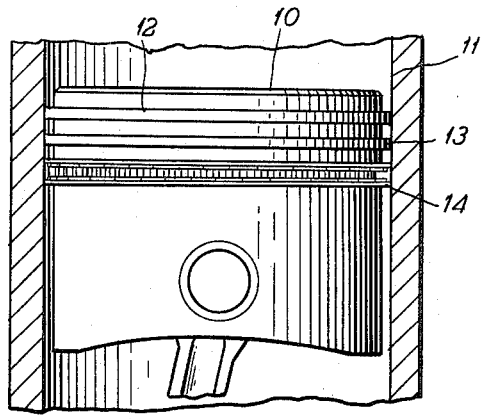
FIG. 1 is a fragmentary view partially in section of a piston received in a piston cylinder.

FIG. 1 illustrates a piston 10 received in a cylinder 11 in an internal combustion engine. The piston 10 has a plurality of ring assemblies therearound including compression rings 12 and 13 and an oil control ring assembly 14.

Figure 2:
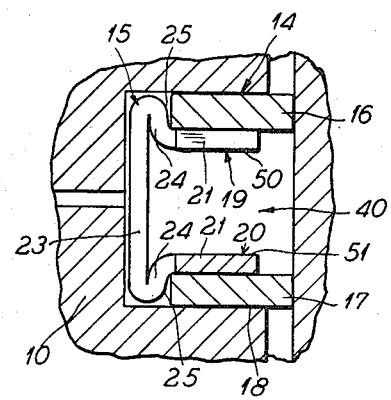
FIG. 2 is a fragmentary enlarged cross-sectional view of an oil control ring assembly received in a groove in a piston in a cylinder.

As illustrated in FIG. 2, the oil control ring assembly 14 consists of an expander-spacer ring 15 and two rail rings 16 and 17. The assembly is received in a ring groove 18 in the piston 10.

Figure 3:
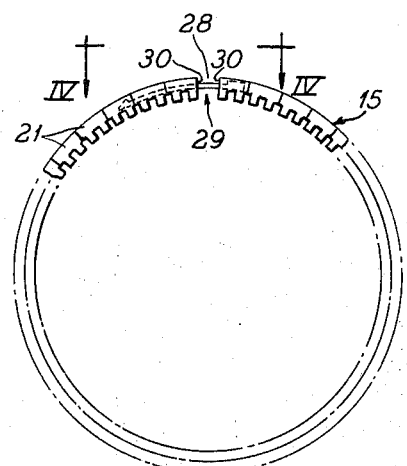
FIG. 3 is a top plan view illustrating an expander-spacer ring equipped with the end guide of this invention.
Figure 4:
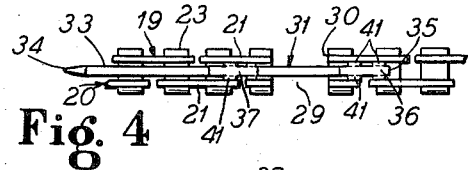
FIG. 4 is a side plan view taken along the lines IV—IV of FIG. 3, illustrating the end guide in position in an expander-spacer ring.

As best illustrated in FIGS. 2, 3 and 4, the expander-spacer ring 15 consists of top 19 and bottom 20 rows of circumferentially spaced segments 21 which project radially. The segments 21 are staggered from one another in the rows 19 and 20 so that a segment 21 in the top row 19 overlies portions of two segments in the bottom row 20. The rows are connected together by up- right fingers 23 at the inner diameter of the radially extending rows 19 and 20. The fingers 23 are integral with the segments 21 through upper and lower axial reverse bend sections 24 which provide axially extending shoulders 25 which project beyond the axial top and bottom of the rows 19 and 20 and which engage the inner diameter of the rail rings 16 and 17.

An example of such spacer-expanders is shown in the U.S. Pat. No. 2,768,038 to H. W. Cable, issued Oct. 23, 1956.

The ring 15 is split as at 28 providing a gap 29 between circumferential ends 30.

In operation, the ring 15 is inserted into the groove in the piston between and behind the rail rings 16 and 17 with the circumferential ends 30 abutted together. The ring is compressed from its normal state with the segments and uprights 23 acting as springs. The spring force generated as a result of the compression acts as a circumferential expander to the rail rings urging them into contact with the wall of the cylinder. In order for the expander-spacer 15 to satisfactorily operate, the ends 30 must be abutted correctly. It is, however, possible to insert the ring with the ends overlapped. In such a situation, the ring will not function properly. In order to avoid this, it has been known to use end guides or gap latches which guide the ends 30 into abutment correctly. Such end guides normally include an elongated member which spans the gap and which is telescopically received in the channel on either one or both sides of the gap. It is necessary for the latch to be telescopically received into the channel on at least one side of the gap so that the expander-spacer can be expanded into non-abutting form for receipt over the piston head. The end guide or gap latch then functions as a guide when the entire assembly is compressed for insertion into the groove of the piston.

This invention provides a new type of end guide 31. The end guide consists of an elongated lance portion 33 which terminates in a barblike end 34. The other end 35 of the lance portion 33 terminates in a head portion 36. A latch head portion 37 acts to retain the lance portion 33 in the channel of the ring as hereinafter described.

Figure 5:
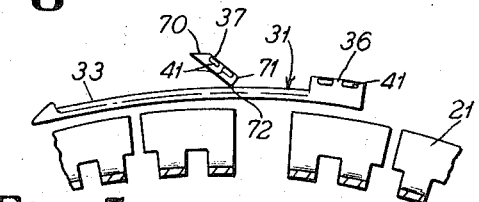
FIG. 5 is a cross-sectional view illustrating the portion of the expander-spacer shown in FIG. 4 prior to installation of the end guide and illustrating the end guide prior to installation into the ring portion.
Figure 6:
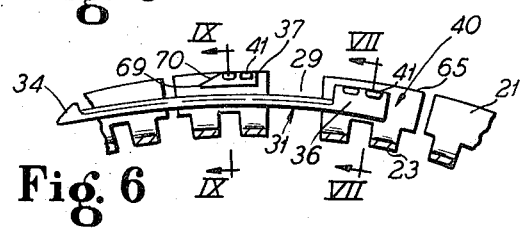
FIG. 6 is a view similar to FIG. 4 illustrating the ring after installation of the end guide.
Figure 7:
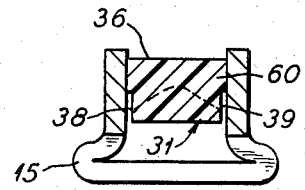
FIG. 7 is a cross-sectional view taken along the lines VII—VII of FIG. 6.
Figure 8:
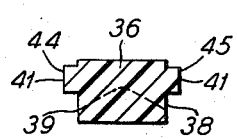
FIG. 8 is a cross-sectional view of the head portion of the end guide as illustrated in FIG. 7 prior to installation into the ring.
Figure 9:
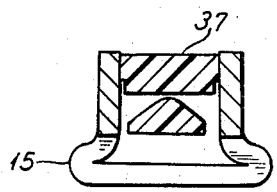
FIG. 9 is a view taken along the lines IX—IX of FIG. 6.

As best illustrated in FIGS. 5, 6, 7, 8 and 9, each head portion 36, 37 has flat axial end walls 38 and 39 which are spaced by the thickness of the material of the head portion. The material of the head portions have an axial thickness slightly less than the axial span of the channel 40 of the ring. Each of the head portions 36, 37 has a pair of projecting nibs in spaced relation from one another. The nibs 41 project outwardly from the faces 38, 39 and terminate in axial end walls 44, 45 which are spaced from one another slightly greater than the axial spacing of the channel 40. Thus, when the head portions are inserted into the channel 40 on either side of the split 29, they will engage the underside faces 50, 51 of the top and bottom rows 19 and 20 of the ring. The material of the head portions preferably, and at least of the nibs 41, is such as to be slightly deformable under the normal resistance to axial expansion of the top and bottom legs 19, 20 of the ring. Thus, as is illustrated in FIGS. 7 and 8, the nibs 41, shown in their free state in FIG. 8, are slightly deformed or compressed as shown at 60 in FIG. 7 and as is illustrated in connection with the head portion 37 in FIG. 9. The lance portion 33 is curved in its circumferential projection from the head 36. The degree of curvature corresponds to the degree of curvature of the ring 15.

The end guide 31, as best illustrated in FIG. 6, is inserted into the channel 40 of the ring with the head 36 positioned intermediate the inner diameter fingers 23 and the outer diameter 65 of the legs 19 and 20. The head portion 36 is preferably inserted as illustrated in FIG. 4 where the four nibs 41 contact the underside surfaces of the segments 21 of the legs 19 and 20. The head portion is inserted in circumferentially spaced relation to the end face 30 of the gap 28 but sufficiently close thereto so as to maximize penetration of the lance portion 33 in the channel 40 on the other side of the gap 29.

The latch head portion 37 is inserted in the channel 40 on the other side of the gap 29 from the head portion 36. The head portion 37 is also inserted intermediate the fingers 23 and the outer diameter of the top and bottom legs. The latch head portion 37 is preferably inserted sufficiently radially deeply into the space between the top and bottom legs so as to abut the enlarged barb portion 34 at the end of the lance. The lance is positioned intermediate the latch head portion 37 and the fingers 23 and is telescopically movable therebetween. When the ring 15 is extended to a more open than normal position, the lance portion will be withdrawn behind the latch head portion 37 until the barbed or increased dimension end 34 abuts the end 69 of the latch head portion 37. This prevents the lance from being totally withdrawn from the channel of the ring remote from the head portion 36.

Figure 10:
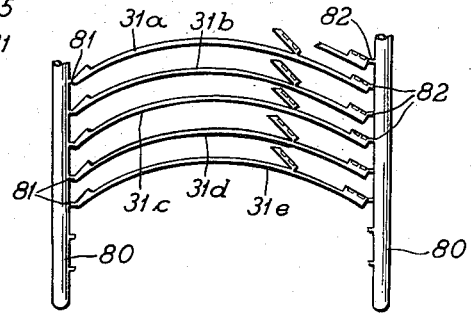
FIG. 10 is a fragmentary plan view of a ladder of end guides as manufactured in a preferred embodiment.

As best illustrated in FIGS. 5 and 10, the end guide of this invention is formed as a single piece. Preferably, the material is a semirigid plastic or glass-filled plastic. It has been found in testing that a 20 percent glass-filled type 6—6 nylon works satisfactorily. Such a material has high temperature strength sufficient to prevent decomposition at normal operating piston cylinder temperatures in an internal combustion engine.

The three parts of the end guide, namely, the first head portion 36, the second or latch head portion 37 and the lance portion 33, are formed as a single piece with the head portion 36 at one end of the lance portion and the head portion 37 projecting radially outwardly from the curvature of the lance portion intermediate the ends 34, 35. The attachment point of the head portion 37 to the lance portion is through a frangible connection.

As illustrated in FIGS. 5 and 10, the latch head portion 37 is a substantially rectangular member having one tapered end 70 remote from the lance portion 33. The opposite end 71 is attached to the lance portion at one edge 72 thereof. THe spacing between the head portion 36 and the head portion 37 at manufacture is set with respect to the spacing of the gap 29 at the time of assembly of the end guide into the channel 40. Thus, where production dynamics require that the spacing be considerable, up to the limits of the length of the lance, then the head portion 37 will be spaced close to the end 34 of the lance. Where production dynamics are such that the gap is less, the head portion 37 may project from the lance portion 33 closer to the head portion 36.

As is illustrated in FIG. 5, the end guide is positioned radially outwardly from the channel of the ring 15 and is then forced into the channel, resulting in a press-fit relationship between the nibs 41 and the undersurfaces of the legs 19 and 20. The force moving the end guide into the channel is preferably applied at the two head portions 36, 37. The application of force to the latch head portion 37 causes that portion to move angularly with respect to the lance 33 during insertion into the channel. This angular movement breaks the frangible connection between the head portion 37 and the lance, separating the head portion 37 from the lance radially outwardly of the lance in the channel.

By manufacturing the latch head portion 37 as an integral part of the remainder of the gap latch, the problems heretofore encountered in the manufacture and assembly of numerous small pieces for end guide assemblies are eliminated. Further, by breaking the head portion 37 from the remaining portion during installation, a telescoping movement end guide is provided where the lance portion has freedom of movement between the second head portion 37 and the bight wall of the ring. At the same time, the second head portion 37 acts to restrain this telescoping movement to prevent exiting of the lance portion from the channel, both radially and circumferentially through abutment with the barbed end portion of the lance.

FIG. 10 illustrates a modified form of the end guide of this invention as manufactured. The end guide is manufactured a plurality of end guides 31a through e at a time. The end guides are arranged with the lance and head portions projecting between two spaced-apart bar members 80. The end guides are spaced from one another along the length of the bar members 80 and resemble the rungs of a ladder. The connections 81, 82 between the ends 34, 35 of the end guides and the bars 80 are thin frangible links. Thus, the individual end guides can easily be broken from the bars 80 of the "ladder" of end guides for installation into the ring channels by automatic or semi-automatic machinery.

It can therefore be seen from the above that my invention provides a new type of expander-spacer piston ring assembly end guide consisting, in operation, of two separate parts, a combined head portion and lance and a second anchoring head portion which functions to prevent egress of a telescopically movable lance portion from the channel of the ring in which the assembly is received. Further, the end guide of this invention is constructed as a single unit with the first and second head portions integrally formed with the lance portion, the second head portion being broken from the lance portion during assembly into the channel of the ring.

Although the teachings of my invention have herein been discussed with reference to specific theories and embodiments and although illustrative means for accomplishing explained results have been described, it is to be understood that these are by way of illustration only and that others may wish to utilize my invention in different designs or applications.

I claim as my invention:

1. A piston ring end guide for use in connection with a substantially U-shaped cross section expander ring which comprises: an elongated body, a head portion at one end of said body, a lance portion projecting from said head portion, said lance portion being curved, the head portion having nibs projecting from opposite sides thereof transverse to the projection of the lance.

2. The end guide of claim 1 wherein a second head portion is provided, the second head portion having nibs projecting from opposite sides thereof.

3. The end guide of claim 2 wherein the second head portion is attached to the lance portion through a frangible connection.

4. The gap latch of claim 3 wherein the lance portion terminates in an increased dimensioned end remote from the head portion.

5. A piston ring end guide comprising an elongated body member, said body member having a head portion at one end thereof with a lance portion projecting therefrom, the lance portion curved, a latching head projecting from said lance portion at an angle thereto, said latching head connected to the lance through a frangible connection.

6. A piston ring and end guide combination comprising a split piston ring having a radially extending channel therein from the outer diameter thereof, a gap latch in said channel, said gap latch having an elongated body portion, a head at one end of said body portion, a lance projecting from said head, said head received in the channel in press-fit relation with top and bottom walls of the channel, said head positioned on one side of said split, the lance projecting across the said split into the channel on the other side of the said split, a latching head positioned in the said channel on the said other side of the said split, said latching head received in the said channel in press-fit relation with top and bottom walls of the channel, and said latching head effective to prevent withdrawal of the said lance from the said channel on the said other side of the split.

7. The assembly of claim 6 wherein the said head and the said latching head have axially projecting nibs on opposite faces, the said nibs engaging the said top and bottom walls of the said channel.

8. The assembly of claim 7 wherein the said nibs are deformed from their free state, their free state axial height from opposed axial ends being greater than the axial height of the said channel.

9. The method of manufacturing a piston ring assembly including a gap latch which comprises the steps of: forming a piston ring having a radial channel therein from a circumferential face thereof, the channel having axially spaced-apart top and bottom walls, forming a gap latch assembly, said gap latch assembly including a body portion with a head at one end thereof and a lance portion projecting from the head and a latching head attached to and projecting from the lance portion at an angle thereto, the latching head attached to the lance portion through a frangible connection, aligning the gap latch assembly with the said channel with the head portion on one side of a split in the said ring and the latching head on the other side of the split in said ring, forcing the said gap latch assembly into the said channel and breaking the frangible connection between the said latching head and the said lance, and positioning the said end guide assembly in the said channel with said head on one side of the said split and the said latching head on the other side of the said split with the lance having a portion thereof between a back wall of the said channel and the said latching head and the said head and latching head in press-fit engagement with the top and bottom walls of the said channel.

10. The method of claim 9 including the steps of forming a plurality of said gap latch assemblies as a single piece and individually separating them from the piece.

11. The method of claim 10 wherein the single piece is formed as a ladder of gap latch assemblies.

* * * * *